(12) United States Patent
Nesbitt et al.

(10) Patent No.: US 7,883,049 B2
(45) Date of Patent: Feb. 8, 2011

(54) JET NOZZLE HAVING NOISE ATTENUATING SHIELD AND METHOD THEREFOR

(75) Inventors: Eric H. Nesbitt, Duvall, WA (US); Mark Yee, Everett, WA (US); Ronen Elkoby, Los Angeles, CA (US); Leonard J. Hebert, Kirkland, WA (US); Thomas E. Alston, Bothell, WA (US)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 11/741,457

(22) Filed: Apr. 27, 2007

(65) Prior Publication Data

US 2008/0264718 A1    Oct. 30, 2008

(51) Int. Cl.
*F02K 1/44* (2006.01)

(52) U.S. Cl. ........................ 244/1 N; 181/215

(58) Field of Classification Search ............ 244/1 N, 244/53 R; 60/770, 324; 181/215, 216
See application file for complete search history.

(56) References Cited

U.S. PATENT DOCUMENTS

| | | | | |
|---|---|---|---|---|
| 3,027,710 | A * | 4/1962 | Maytner | 239/127.3 |
| 3,174,282 | A * | 3/1965 | Harrison | 239/265.17 |
| 3,637,042 | A * | 1/1972 | Raynes | 181/216 |
| 3,655,008 | A * | 4/1972 | Millman | 181/216 |
| 5,771,681 | A | 6/1998 | Rudolph | |
| 5,947,412 | A * | 9/1999 | Berman | 244/1 N |
| 6,220,546 | B1 * | 4/2001 | Klamka et al. | 244/129.4 |
| 6,311,928 | B1 * | 11/2001 | Presz et al. | 244/110 B |
| 6,314,712 | B1 | 11/2001 | Thierron | |
| 6,318,070 | B1 | 11/2001 | Rey et al. | |
| 6,487,848 | B2 | 12/2002 | Zysman et al. | |
| 6,505,706 | B2 * | 1/2003 | Tse | 181/213 |
| 6,532,729 | B2 | 3/2003 | Martens | |
| 6,718,752 | B2 | 4/2004 | Nesbitt et al. | |
| 6,826,901 | B2 * | 12/2004 | Hebert | 60/204 |
| 6,969,028 | B2 | 11/2005 | Dun | |

* cited by examiner

*Primary Examiner*—Timothy D Collins
*Assistant Examiner*—Brian M. O'Hara
(74) *Attorney, Agent, or Firm*—Harness, Dickey & Pierce, P.L.C.

(57) ABSTRACT

An arcuate or semi-circumferential shield in the shape of a visor that is adapted to be secured to an external surface of a nozzle housing of a jet nozzle to attenuate jet noise generated by the jet nozzle. The shield may be fixedly secured to the nozzle housing or movably supported so that it can be moved between retracted and deployed positions. When used as a fixedly mounted component, or when positioned in its deployed position, a downstream edge of the shield extends past a downstream edge of the nozzle housing and the shield is spaced apart from an outer surface of the nozzle housing to form a channel therebetween. The shield is preferably orientated at approximately a bottom dead center of the nozzle housing. The shield operates to attenuate jet installation noise, and particularly jet installation noise experienced during the takeoff phase of flight of a jet aircraft, as well as to reduce jet installation noise that would otherwise propagate forwardly toward the cockpit of the aircraft.

20 Claims, 5 Drawing Sheets

JET NOZZLE HAVING NOISE ATTENUATING SHIELD AND METHOD THEREFOR

FIELD

The present disclosure relates to nozzles for jet engines, and more particularly to a nozzle housing that houses a jet engine, where the nozzle housing includes a noise attenuating shield for attenuating noise.

BACKGROUND

The statements in this section merely provide background information related to the present disclosure and may not constitute prior art.

The noise a jet engine makes when it is installed under the wing of an airplane can be broken down into components. Two of the most significant components are jet noise and jet installation noise. Jet noise is the noise the jet makes and that it would make whether or not it is installed on an aircraft. Jet installation noise is the additional noise the jet makes due to the presence of the wing and flap system of the aircraft. Jet installation noise is a significant consideration for present day commercial passenger transport and freighter jet aircraft when the engines are installed under the wings.

At the present time, with new aircraft development, jet installation noise may limit or influence a wide variety of component design factors. Components that might be design influenced or limited in some manner because of the expected or anticipated influence of jet installation noise may involve one or more of the following:
  restricting fan diameter;
  lengthening landing gear;
  increasing wing dihedral angle;
  decreasing flap angle, which produces reduced low speed aerodynamic performance;
  impacts to wing trailing edge design;
  longer and heavier engine strut; and
  affecting aircraft balance and loading.

The use of chevron type nozzles is currently the principally accepted way of achieving jet noise reduction on an existing jet engine without a significantly large weight and performance penalty. Chevron nozzles are triangular shaped devices installed on the downstream edge of the jet engine fan and primary exhaust nozzles. The chevrons increase mixing of the flow leaving the nozzle with ambient air and reduce jet noise. In addition recent work has also shown that the chevrons can reduce jet installation noise as well, which is a major component of aircraft noise. Typical chevron design reduces low frequency noise but can in some instances produce some increase in high frequency noise. This increase in high frequency noise is typically in the forward radiation angles (as measured from the engine inlet axis, or forwardly toward the nose of the aircraft).

Thus, it would be highly beneficial and desirable to provide a jet nozzle that operates to reduce jet installation noise, as well as to inhibit the radiation of high frequency jet installation noise that is generated close to the downstream exit of the nozzle that would ordinarily tend to propagate forwardly toward the nose of an aircraft.

SUMMARY

The present disclosure relates to a jet nozzle apparatus and method that significantly attenuates jet installation noise on a jet aircraft. In one embodiment the apparatus includes a nozzle housing having an outer surface. A shield is disposed adjacent the outer surface and a downstream edge of the shield extends past a downstream edge of the nozzle housing. The shield is also mounted so as to be spaced apart from the outer surface of the nozzle housing to form a channel between an inner surface of the shield and the outer surface of the nozzle housing.

In one specific embodiment the shield is fixedly mounted on the exterior surface of the housing such that it is not movable. In another embodiment the shield is movably mounted so that it may be moved between retracted and deployed positions. In its retracted position, the shield is held closely adjacent the outer surface of the nozzle housing so that the channel is substantially or completely eliminated. In its deployed position the shield is moved to a position where its downstream edge extends in a downstream direction past the downstream edge of the nozzle housing. Various forms of actuators such as electromechanical, hydraulic or shape memory alloy (SMA) actuators may be employed to move the shield.

In one embodiment the shield has a generally circumferential shape when viewed end-wise, and is shaped generally similar to a visor.

In one embodiment the shield is positioned at approximately a bottom dead center location of the nozzle housing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
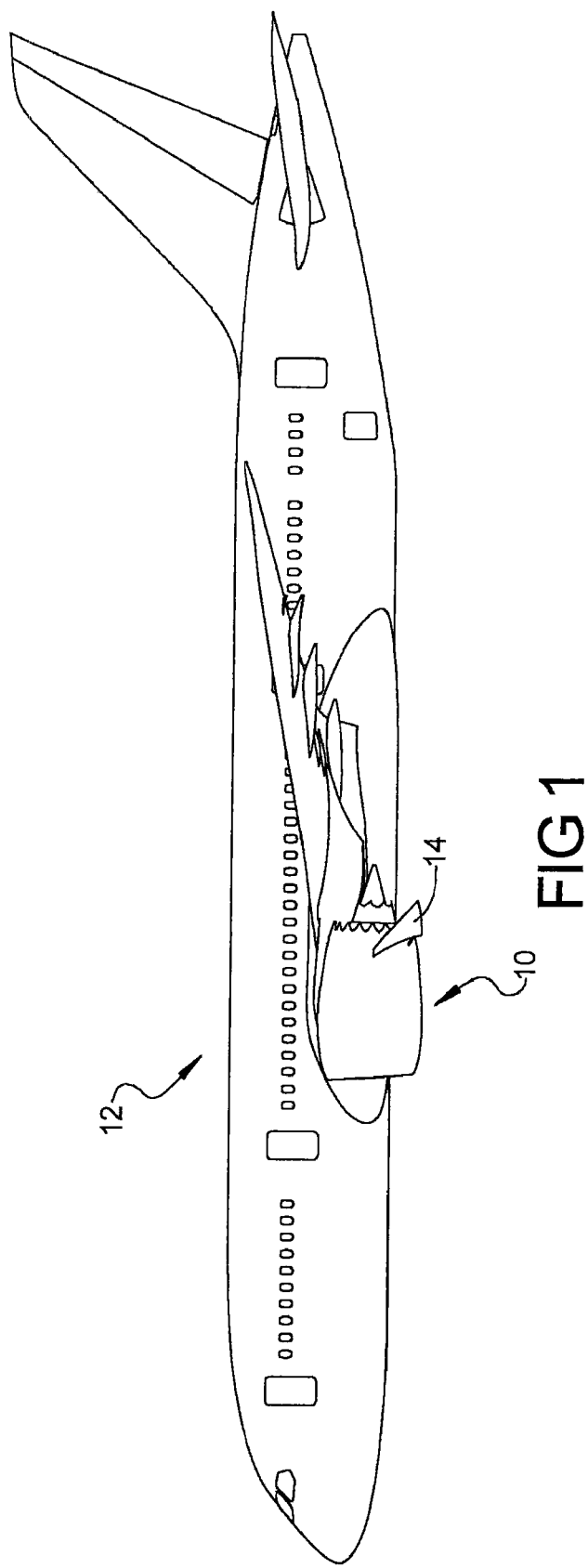
FIG. 1 illustrates a commercial jet passenger aircraft with a nozzle apparatus in accordance with one embodiment of the present disclosure incorporated thereon.

Referring to FIG. 1, a nozzle apparatus 10 is illustrated in use on a commercial passenger jet aircraft 12. While a commercial passenger jet aircraft is shown, it will be appreciated that the nozzle apparatus 10 can be used on freighter jet aircraft or even on military jet aircraft. The nozzle apparatus 10 is expected to find utility on other forms of jet powered mobile platforms, for example jet powered rotorcraft, as well. It is anticipated that the nozzle apparatus 10 may find applicability with essentially any form of jet powered mobile platform where it is desirable to reduce jet installation noise.

Figure 2:
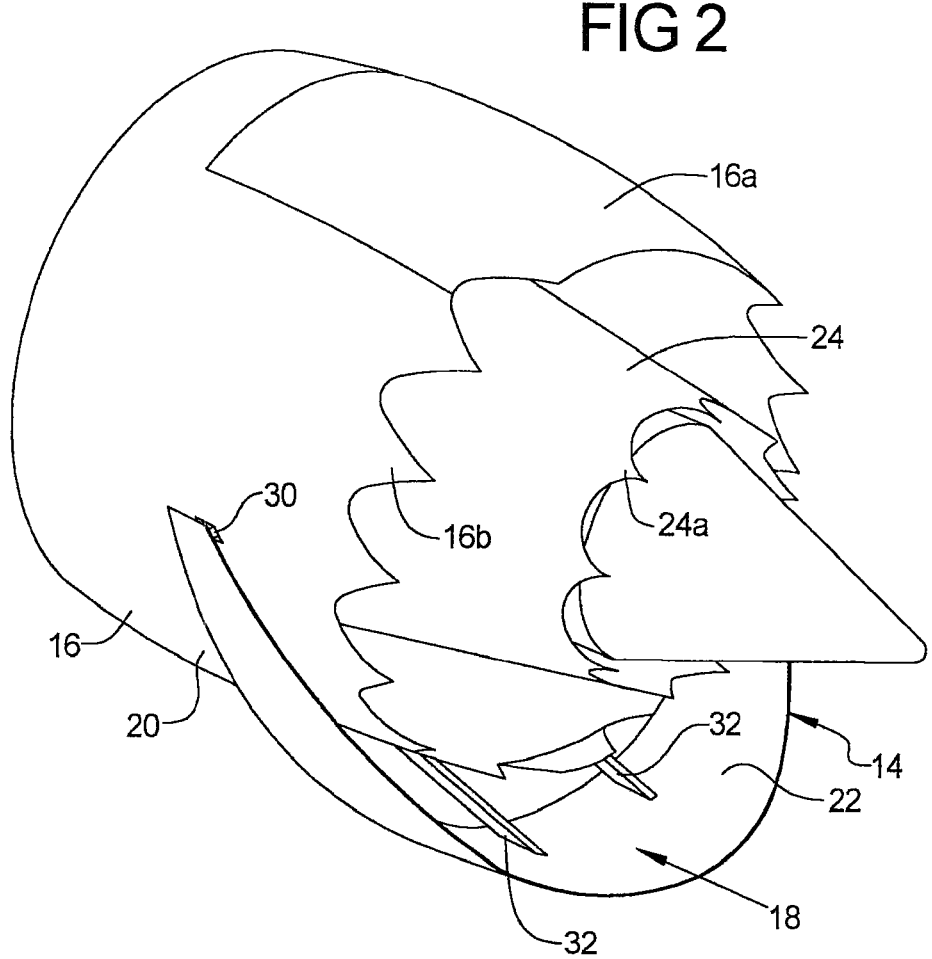
FIG. 2 is an enlarged, rear three-quarter perspective view of just the nozzle apparatus shown in FIG. 1.
Figure 3:
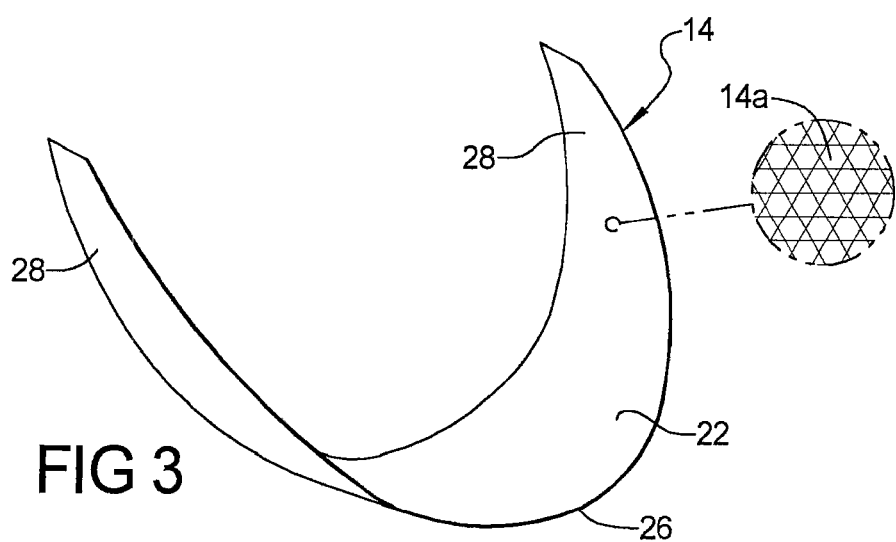
FIG. 3 is a perspective view of just the shield shown in FIG. 1.
Figure 4:
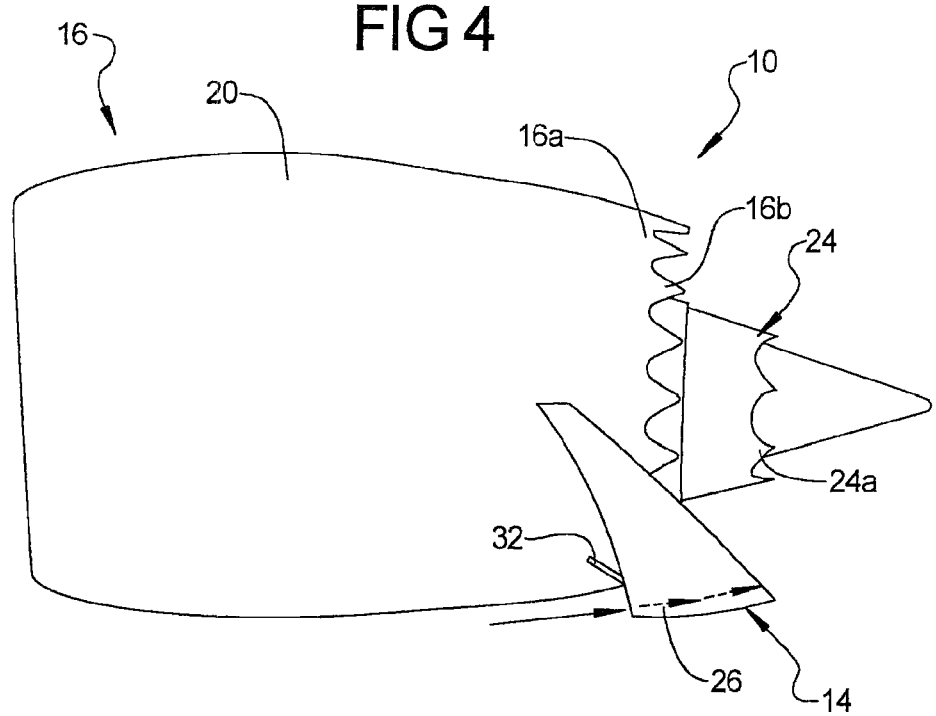
FIG. 4 is a side view of the apparatus shown in FIG. 1.

Referring further to FIGS. 2, 3 and 4, the nozzle apparatus 10 is shown in further detail. The nozzle apparatus 10 includes a flow control structure 14 which in one embodiment has an arcuate shape, and may be viewed as forming a shield. Merely for convenience, the flow control structure 14 will be referred throughout the following description as "shield 14". In one specific embodiment, the arcuate shape of the shield 14 forms a semi-circumferential shape. However, the shield 14 can have other shapes including a flat shape if desired.

The shield 14 is preferably at least slightly larger than the outer diameter of a nozzle housing 16 of the nozzle apparatus 10 at a downstream end 16a of the nozzle housing 16. This enables a channel 18 (FIG. 2) to be formed between an outer surface 20 of the nozzle housing 16, which in this example is a fan or "secondary" nozzle housing, and an inner surface 22 of the shield 14 when the shield is attached to the nozzle housing 16. Although the shield 14 is shown extending halfway around the nozzle housing 16, it is understood that it could have a shorter or longer circumferential extent. The shield 14 preferably has a one-piece continuous construction, but could be two or more pieces in spaced or attached relation. Still further, it is expected that in most applications, forming the shield 14 as a solid barrier will be a preferred construction, rather than of a porous construction that allows a portion of air flowing thereover to flow through the shield. Nevertheless, in some limited applications, a porous construction may provide some benefit, and is therefore also contemplated to be within the realm of the present disclosure.

It is also contemplated to be within the scope of the present disclosure that the shield 14 could just as readily be secured to the exterior surface of a primary nozzle 24 illustrated in FIG. 2. At the present time, however, it is anticipated that the mounting of the shield 14 on the outer surface of a fan nozzle will be the preferred construction in most applications to maximize jet installation noise attenuation. Also, both the nozzle housing 16 and the primary nozzle 24 can be seen to each include a plurality of chevrons 16b and 24a, respectively. But the nozzle apparatus 10 could just as readily be constructed without any chevrons. The shield 14 is therefore equally applicable, and effective for reducing noise, in nozzle apparatuses that do not use chevrons. Incorporating the chevrons 16b and 24a, however, may optimize the jet installation noise reduction that is provided by the nozzle apparatus 10. This is due to the chevrons providing jet noise and jet installation noise reduction by providing better mixing of the jet flow leaving the nozzle apparatus 10. The nozzle apparatus 10 thus provides noise reduction over and above the reduction that the chevrons provide. This will be discussed further in the following paragraphs in connection with FIG. 8.

Figure 5:
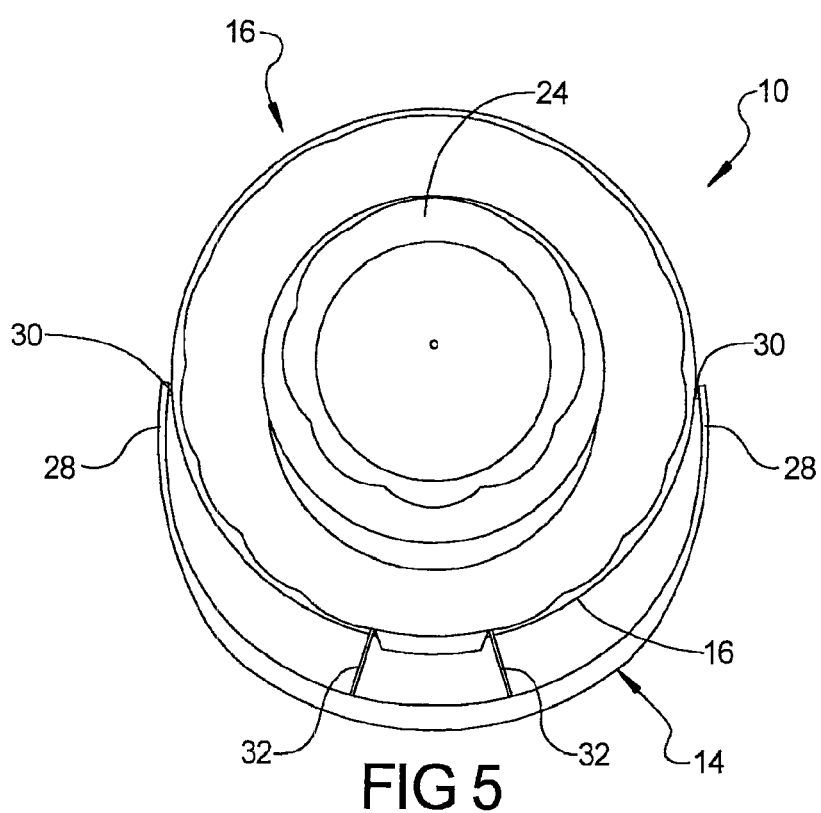
FIG. 5 is a rear view of the nozzle apparatus of FIG. 2.

With further reference to FIGS. 3-5, the shield 14 can be seen in greater detail. In this exemplary embodiment the shield 14 includes a central portion 26 from which a pair of symmetric, spaced apart arms 28 extend. The entire shield 14 may be constructed with a honeycomb acoustic treatment, or any other form of sound attenuating material that is suitable for high environmental stress applications. The honeycomb acoustic material construction helps to attenuate the forwardly radiated high frequency noise. However, the shield 14 can be used without any specific sound attenuating material construction, or alternatively could simply be coated with a suitable sound attenuation material and will still operate to significantly attenuate jet installation noise.

The arms 28 are coupled to a pair of spacers 30 (FIG. 5). The spacers 30 are in turn fixedly coupled to the outer surface 20 of the nozzle housing 16. Any suitable fastening elements, for example rivets, may be used to secure the arms 28 and spacers 30 to the nozzle housing 16. The central portion 26 is supported by at least one strut 32 or strut-like element, and more preferably a pair of struts 32. The struts 32 are each fixedly coupled at opposite ends to the inner surface 22 of the shield 14 and to the exterior surface 20 of the nozzle housing 16. Alternatively, the struts 32 could each have one end that extends through a small opening in the nozzle housing 16 and be secured fixedly to an interior surface of the nozzle housing 16. Essentially any arrangement of components that are able to securely hold the shield 14 to the nozzle housing 16 may be employed. Accordingly, the nozzle apparatus 10 is not limited to only one type of mounting arrangement.

With further reference to FIGS. 3-5, the shield 14 can be seen to have a shape that is similar to a visor with a generally semi-cylindrical shape when viewed end-wise. While the shield 14 is shown as having a semi-cylindrical shape that is not of a constant radius, forming the shield 14 to have a constant radius, or other shapes, is also contemplated to be within the present disclosure. With either construction, the channel 18 operates to separate the exterior surface 20 of the nozzle housing 16 at the downstream end 16a from the interior surface 22 of the shield 14 by preferably about $\frac{1}{12}$ of the nozzle housing 16 diameter (i.e., the diameter of the "secondary nozzle"). The shield 18 is preferably also mounted such that it is located at approximately a bottom dead center of the nozzle housing 16 to maximize its ability to impede noise from propagating forwardly. It will be appreciated, however, that other locations for the shield 14 could be selected as needed to address particular noise control or integration issues.

The shield 14 may be formed from aluminum, from composites or any other suitable material that is sufficiently robust to handle the severe environmental conditions that the shield 14 will be exposed to. In one embodiment the shield 14 may have a honeycomb construction, as indicated at 14a in FIG. 3. The shield 14 may have a thickness of preferably between about one inch to about three inches (2.54 cm-7.62 cm), but this may be varied significantly depending on the specific materials used to form the shield 14, as well as the needs of a particular application.

In operation, it is believed that the significant degree of jet installation noise sound attenuation that is achieved with the shield 14 is caused in significant part by the channel 18. It is believed that the channel 18 accelerates the air flow (i.e., fluid flow) through the channel exiting from the outer, downstream edge 16a of the nozzle housing 16. This in turn is believed to reduce the shear layer on the bottom half of the nozzle apparatus 10, and to alter the local pressure distribution, which effectively "pulls" the fluid flow leaving the nozzle apparatus 10 downwardly away from the flaps on the wing of the aircraft 12. Impingement of the fluid flow (also termed "jet flow") from the nozzle apparatus 10 on the flaps, the lower surfaces of the wings, and even the fuselage is known to contribute significantly to jet installation noise. Thus, it is believed that redirecting or "pulling" the fluid flow leaving the nozzle apparatus 10 away from the aircraft 12 significantly reduces its impingement (or "scrubbing") on various surfaces of the aircraft. By doing this the shield 14 also reduces the low frequency (50-400 Hz) jet installation noise. The shield 14, when constructed of a honeycomb construction or otherwise acoustically treated, also has a particular benefit in reducing the propagation of high frequency (i.e., typically about 1 kHz or higher) noise forwardly towards the cockpit of the aircraft 12.

Figure 8:
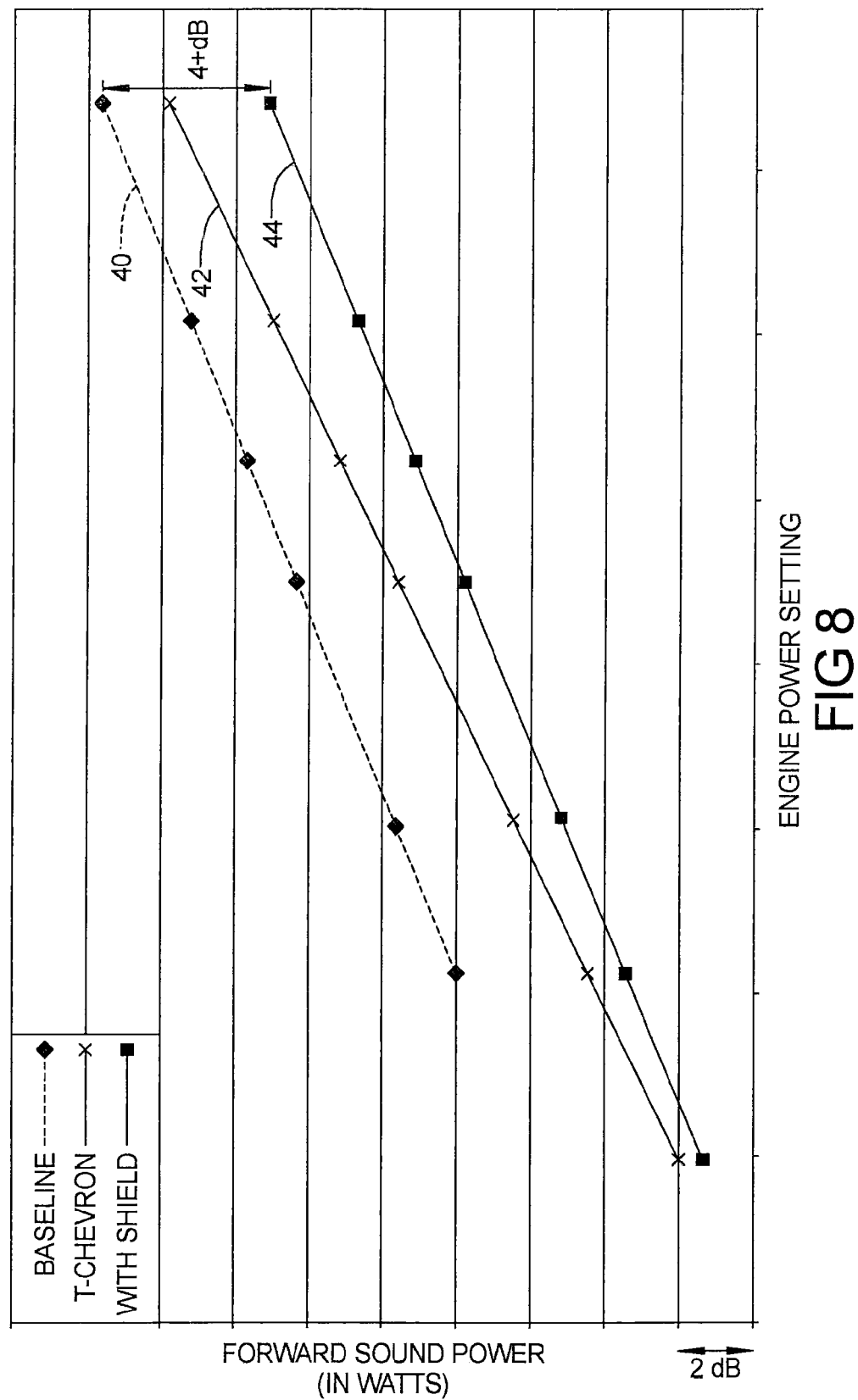
FIG. 8 is a graph illustrating a reduction in jet installation noise provided by one embodiment of the nozzle apparatus.

With brief reference to FIG. 8, the reduction in jet installation noise with the nozzle apparatus 10 is shown. FIG. 8 illustrates sound power levels experienced with: 1) a baseline approach (i.e., without the chevrons 16b and 24a, and without the shield 14) indicated by curve 40; 2) an otherwise conventional jet nozzle having the chevrons 16b and 24a, represented by curve 42; and 3) the nozzle apparatus 10, as represented by curve 44. From the above-mentioned curves, it can be seen that with the nozzle apparatus 10 there is a reduction in sound power that corresponds to an approximate 2 dB installation noise level reduction over a conventional jet nozzle that uses chevrons, and a reduction in sound power that corresponds to an approximate 4 dB reduction over a conventional jet nozzle that does not use chevrons.

Figure 6:
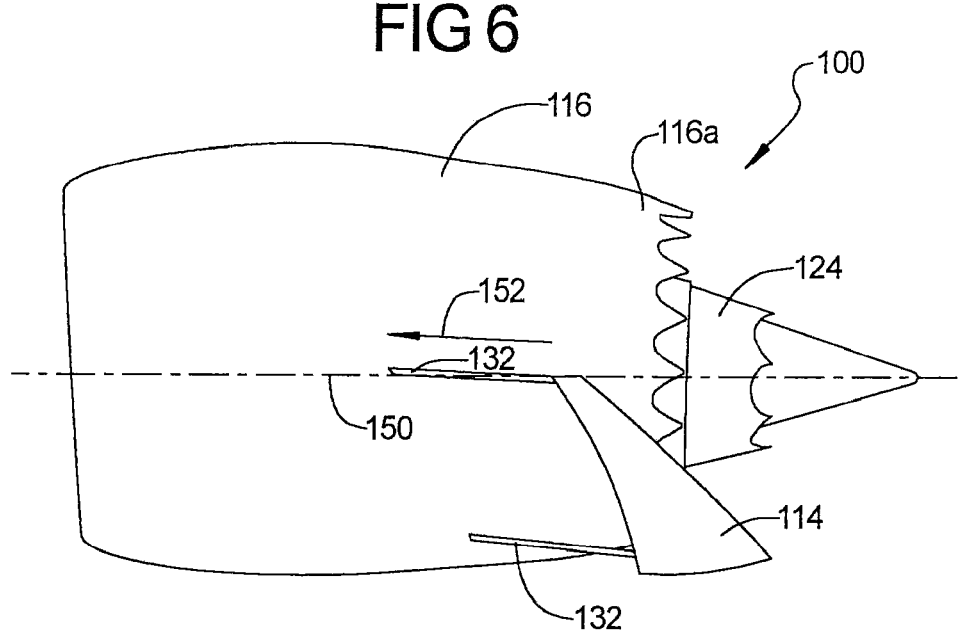
FIG. 6 is a side view of another embodiment of the present nozzle apparatus that incorporates a shield that is movable between retracted and deployed positions, with the shield being illustrated in its deployed position.
Figure 7:
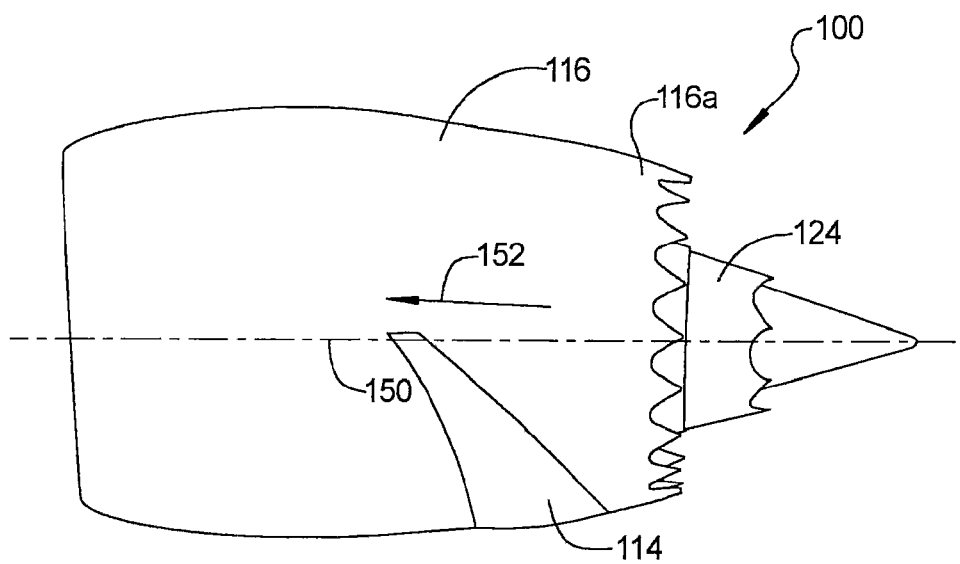
FIG. 7 illustrates the apparatus of FIG. 6 but with the shield shown in its retracted position.

Referring to FIGS. 6 and 7, another nozzle apparatus 100 in accordance with the present disclosure is shown. The apparatus 100 is similar to nozzle apparatus 10 and common components are identified by reference numerals increased by 100 over those used to describe the apparatus 10. The principal difference between nozzle apparatus 10 and nozzle apparatus 100 is that nozzle apparatus 100 includes a shield 114 that is movably supported relative to its nozzle housing 116. This is accomplished by supporting the shield 114 by a plurality of struts 132 that may be similar in construction to struts 32. Each strut 132 may be formed as a component of an electromechanical actuator, a hydraulic actuator or even from a shape memory alloy (SMA) material. The struts 132 serve to move the shield 114 in a generally linear fashion upwardly relative to a longitudinal centerline 150 of the nozzle apparatus 100, and forwardly in accordance with directional arrow 152 (i.e., toward the cockpit of the aircraft). The shield 114 is shown in its deployed position in FIG. 6 and its retracted position in FIG. 7. In the fully retracted position the shield 114 has no affect on the jet flow exiting the nozzle apparatus 100. If SMA actuators are used, the SMA material may be constructed so that the SMA actuators change shape to automatically deploy and retract the shield 114 in response to predetermined temperatures that are experienced by the shield 114.

The various embodiments of the system and method described herein thus enable jet installation noise to be significantly reduced. Furthermore, while various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A jet nozzle apparatus comprising:
   a nozzle housing; and
   a shield generally in a shape of a visor spaced from a trailing edge of the nozzle housing and extending over an arc of less than about 180 degrees, that interacts with an output flow from the nozzle to affect noise generated by an output flow exiting the nozzle housing;
   said shield having a central portion and a pair of arm portions extending from the central portion that taper to distal ends, the shield, when in an operative position, positioned such that the central portion covers at least a trailing edge of said nozzle housing and also extends downstream beyond the trailing edge of the nozzle housing; and
   the shield, when in the operative position, having an interior surface of the central portion spaced a distance corresponding to approximately $\frac{1}{12}$ a diameter of the nozzle housing, from an exterior surface of the nozzle housing.

2. The apparatus of claim 1, wherein said shield is positioned at approximately a bottom dead center location of said nozzle housing.

3. The apparatus of claim 1, wherein said shield is fixedly secured to said nozzle housing so as to be non-movable, and such that said shield is always in the operative position.

4. The apparatus of claim 1, wherein said shield is moveably secured to said nozzle housing and moveable between a retracted position adjacent said nozzle housing, and a deployed position, and such that said shield is in the operative position when placed in the deployed position.

5. The apparatus of claim 4, wherein said shield is spaced apart from an outer surface of said nozzle housing to form a channel therebetween when said shield is in said deployed position.

6. The apparatus of claim 4, further comprising an actuator coupled to said shield to move said shield between said retracted and said deployed positions.

7. The apparatus of claim 6, wherein said actuator comprises an electromechanical actuator.

8. The apparatus of claim 6, wherein said actuator comprises a shape memory alloy actuator.

9. The apparatus of claim 6, wherein said actuator comprises an hydraulic actuator.

10. The apparatus of claim 1, wherein said shield comprises a semi-circumferential shape having a radius of curvature larger than a radius of curvature of said nozzle housing at said trailing edge of said nozzle housing.

11. The apparatus of claim 1, wherein said nozzle housing comprises a bypass nozzle.

12. The apparatus of claim 1, wherein said nozzle housing comprises a primary nozzle.

13. The apparatus of claim 1, wherein said trailing edge of said nozzle housing includes a plurality of chevrons.

14. A jet nozzle apparatus comprising:
    a nozzle housing;
    an arcuately shaped shield having a shape generally in accordance with a visor, and being positioned generally along a lower portion of the nozzle housing and mounted so as to extend over an arc of no more than about 180 degrees, and to cover a trailing edge of the nozzle housing while also projecting past the trailing edge of the nozzle housing when in an operative position;
    said shield further having a central portion and a pair of arm portions that taper to distal ends, the shield being positioned in an operative, deployed position along the lower portion of said nozzle housing and spaced from an outer surface of the nozzle housing such that a channel is formed between the outer surface of the nozzle housing and an inner surface of the central portion of the shield, with a spacing between the outer surface of the nozzle housing and the inner surface of the central portion of the shield being a distance corresponding to about $\frac{1}{12}$ a diameter of the nozzle housing at the trailing edge of the nozzle housing;
    the shield further including a sound absorbent material and being adapted to interact with a flow exiting from the nozzle housing to limit noise generated by said output flow; and
    the shield being retractable into a non-operative, retracted position adjacent the outer surface of the nozzle housing without the need for a recess formed in the outer surface of the nozzle housing.

15. The apparatus of claim 14, wherein said shield is positioned at approximately a bottom dead center of said nozzle housing.

16. The apparatus of claim 14, further comprising an actuator for moving said shield, said actuator including at least one of:
- an electromechanical actuator;
- an hydraulic actuator; and
- a shape memory alloy (SMA) actuator.

17. A method for attenuating noise from a jet nozzle, comprising:
- providing a nozzle housing: and
- supporting a shield generally in the shape of a visor and having a central portion with a pair of arm portions that taper to distal ends, adjacent an outer surface of the nozzle housing, and where the shield extends over an arc of no more than about 180 degrees, such that a portion of the shield covers a trailing edge of the nozzle housing, and also such that a downstream portion of said shield extends past the trailing edge of said nozzle housing, and further such that an inner surface of said central portion of said shield is spaced apart from said outer surface of said nozzle housing by a distance corresponding to about 1/12 a diameter of the nozzle housing, to form a channel for enabling airflow through the channel.

18. The method of claim 17, further comprising supporting said shield for movement between a retracted position and a deployed position, the deployed position forming the operative position.

19. The method of claim 17, wherein supporting said shield for movement comprises:
- supporting said shield in said retracted position so that said shield is held adjacent said outer surface to eliminate said channel, and such that a downstream edge of said central portion of said shield does not extend past said trailing edge of said nozzle housing; and
- supporting said shield in said deployed position so that said downstream edge of said central portion of said shield extends past said trailing edge of said nozzle housing, and said shield is spaced apart from said outer surface of said nozzle housing to form said channel.

20. The method of claim 17, further comprising fixedly securing said shield to said nozzle housing so that said shield forms a non-moveable component.

* * * * *